United States Patent [19]

Martinez de Pinillos et al.

[11] 4,314,084

[45] Feb. 2, 1982

[54] SYNTHESIS OF LOWER ALKYL AMINES

[75] Inventors: Joaquin V. Martinez de Pinillos, Wescosville, Pa.; Robert L. Fowlkes, Milton, Fla.

[73] Assignee: Air Products and Chemicals, Inc., Allentown, Pa.

[21] Appl. No.: 156,228

[22] Filed: Jun. 4, 1980

Related U.S. Application Data

[63] Continuation of Ser. No. 974,644, Dec. 29, 1978, abandoned.

[51] Int. Cl.$^3$ ............................................. C07C 85/02
[52] U.S. Cl. .................................. 564/480; 252/466 J
[58] Field of Search ................. 260/585 B; 252/466 J; 564/480

[56] References Cited

U.S. PATENT DOCUMENTS

| 2,033,866 | 3/1936 | Schranth | 260/585 B |
| 2,636,902 | 4/1953 | Taylor | 260/585 B |
| 2,795,600 | 6/1957 | Chitwood | 260/585 B |
| 3,274,253 | 9/1966 | Markiewitz | 260/585 B |
| 4,014,933 | 2/1977 | Boettger et al. | 260/585 B |
| 4,036,883 | 7/1977 | Voges et al. | 260/585 B |

*Primary Examiner*—John F. Niebling
*Attorney, Agent, or Firm*—Douglas G. Glantz; E. Eugene Innis; James C. Simmons

[57] ABSTRACT

This invention relates to an improved process for synthesizing lower alkyl amines via the gas phase ammonolysis of a lower alkanol. The improvement in the gas phase ammonolysis process resides in the use of a finely divided hydrogenation catalyst comprising a group 8 metal supported on a comparatively neutral alumina substrate, said neutrality to the support being imparted by the addition of an alkaline earth metal.

6 Claims, No Drawings

SYNTHESIS OF LOWER ALKYL AMINES

This is a continuation of application Ser. No. 974,644, filed Dec. 29, 1978, now abandoned.

BACKGROUND OF THE INVENTION

1. Field of the Invention

This invention relates to a process for producing lower alkyl amines particularly ethyl, n-propyl, isopropyl, n-butyl and isobutylamine.

2. Description of the Prior Art

U.S. Pat. No. 4,014,933 discloses a process for preparing amines by reacting alcohols with ammonia or primary or secondary amines at elevated temperatures in the presence of hydrogen and a hydrogenation catalyst containing cobalt, nickel, and copper optionally with small amounts of phosphoric acid, boric acid or salts of alkaline metals and alkaline earth metals.

U.S. Pat. No. 2,033,866 discloses a process for producing cycloaliphatic primary amines by reacting higher molecular weight aliphatic alcohols with ammonia in the presence of a dehydrating catalyst e.g. a metallic oxide.

U.S. Pat. No. 3,274,253 discloses a process for producing lower alkyl amines by the reaction of a lower alkanol with ammonia in the presence of a hydrogenation catalyst. A co-catalyst is used in conjunction with the hydrogenation catalyst, the co-catalyst consisting of an alkali metal hydroxide, a weak acid salt of alkali metal hydroxide e.g. the carbonates and bicarbonates of the alkali metals.

A technical data sheet published by Girdler Chemical, Inc. discloses that various cobalt containing catalysts supported on kieselguhr or alumina as being useful for the amination of alcohols, reduction of nitriles, carbonyls and aromatics.

SUMMARY OF THE INVENTION

This invention relates to an improvement in a process for producing a lower alkyl amines by the gas phase ammonolysis of lower alkanols. The improved process resides in utilizing a finely divided hydrogenation catalyst comprising a group 8 metal supported on a comparatively neutral alumina, the neutrality being imparted into the support by the addition of an alkaline earth metal.

Several advantages exist in using the particular catalysts for the synthesis of amines as contemplated by this invention and these advantages include:

an ability to produce lower alkyl amines, e.g. $C_2$ to $C_6$ in high yield with good conversion;

an ability to operate so that low amounts of unsaturated hydrocarbon is produced during the ammonolysis thus retarding the build up of coke on the catalyst itself thereby extending the catalyst life;

an ability to recycle by-product acetonitrile and convert it to ethylamine;

an ability to synthesize high molecular weight amines with smaller amounts of lower amine by-product, such result presumably due to reduced cracking of the alkanol; and an ability to produce amines in high concentrations at low reaction temperatures.

DESCRIPTION OF THE PREFERRED EMBODIMENT

This invention is an improvement in the low temperature gas phase production of amines. In the conventional way of producing lower alkylamines, e.g. $C_2$ to $C_6$ amines by the low temperature catalytic reaction, ammonia and a lower alkanol are reacted at a temperature of about 300°–500° F. at a pressure of about 200–500 psig, generally about 250 to 300 psig. The reaction typically is carried out in the presence of hydrogen to reduce the quantity of nitrile by product. The catalyst normally used is a hydrogenation catalyst comprising a Group 8 metal. Examples of Group 8 metals commonly used are cobalt, copper, nickel, chromium and the like although nickel and cobalt are the primary catalyst materials used.

The conventional amount of ammonia to alkanol used is generally from about 2–20 moles ammonia per mole of alkanol. Lesser quantities of ammonia result in insufficient amine forming compound. Higher quantities of ammonia, i.e. higher than stoichiometric quantities even within the range specified, tend to result in more monoamine production. The ratio of hydrogen used in the ammonolysis should be about ¼ to 4 moles per mole of alkanol. Lower quantities of hydrogen result in increased nitrile production and quantities higher than stoichiometric (based on nitrile content) generally afford no significant advantages. Therefore, the ratio of ammonia to alkanol to hydrogen on a molar basis (N/R/H) is from about 2–20/1/0.25–4.

In the gas phase ammonolysis of the alcohol, a gas hourly space velocity (GHSV) of from about 500 to 5,000 volumes reactant per volume of catalyst per hour is utilized. When the rate exceeds about 5,000 volumes per volume catalyst per hour, the conversion or yield falls. On the other hand, lower space velocity rates do not result in significant increase in product quality or yield to justify the increased reaction time. Preferably gas space velocities are 1,000–3,000.

The catalysts used in the ammonolysis of the lower alkyl amines is a hydrogenation catalyst supported on an alumina substrate with the alumina being essentially neutral in pH. The hydrogenation catalyst, as in conventional processes, comprises metals such as nickel, cobalt, copper, and chromium with nickel and cobalt being the preferred hydrogenation elements. Although in the past, a variety of support materials have been utilized for these metal components, e.g. silica, kieselguhr (a form of silica), silica-alumina and aluminia have been used, we found that there are inherent disadvantages. With an unneutralized alumina, large quantities of hydrocarbons are produced which tends to result in poor catalyst life, catalyst life being retarded by virtue of hydrocarbon decomposition.

The alumina support for the catalyst used in this invention generally is prepared synthetically. Quite often the alumina is prepared by precipitation methods wherein an alkaline reagent such as ammonium hydroxide, or ammonium carbonate is commingled with an acidic solution of an aluminum salt, e.g. aluminum chloride, aluminum sulfate, aluminum nitrate, etc. The metallic content in the catalyst is introduced by adding an appropriate salt, e.g. nickel nitrate, nickel formate or an acid salt such as nickel chloride and nickel sulfate with the alumina hydrogel and precipitating. After precipitation, the catalyst then is calcined at temperatures of from about 1000° to about 1200° F. for a period of about 0.5 to 10 hours. Generally, calcining takes in the order of 2-4 hours.

The basic differences in the substrate system utilized in the catalyst suited for practicing this invention resides in its substantial neutrality and in the specific type of neutralizing agent. When alkali metals and ammonia are used as the alkaline material, a neutral substrate is obtained, but such alkaline material is removed during reaction by virtue of the inherent solubility of these materials. Therefore, good results are obtained during the early stages of the process but as time passes conversions and yields fall. In practicing the present invention, alkaline earth metals are used to neutralize the acidity in the alumina substrate. This is accomplished by the addition of barium or calcium salts or hydroxides which form substantially water insoluble components within the alumina substrate itself. The quantity of calcium or barium hydroxide, of course, is regulated to the extent that is necessary to adjust the pH to about 6.5-7.5, generally 7, at which time the hydrogel is precipitated and calcined in conventional manner.

The following examples are provided to illustrate preferred embodiments of the invention are not intended to restrict the scope thereof.

EXAMPLE 1

The conversion of ethanol to monoethylamine by reaction with ammonia in the presence of hydrogen was effected in a laboratory reactor at a temperature of 420° F. and a pressure of 250 psig. The volume of catalyst in the laboratory reactor was 100 cubic cm of a Girdler-62RS cobalt catalyst. This catalyst contained approximately 34% cobalt supported on an alumina substrate, the alumina being substantially neutral pH. The surface area in meters squared per gram was approximately 42 with a DWL crush strength (in pounds) of 15. The bulk density was approximately 50 plus or minus 5 pounds per cubic foot.

Table 1 below represents the results of the ammonolysis where variations in reaction conditions, i.e., where the ratio of ammonia to ethanol to hydrogen (N/R/H) on a molar basis and the gas hourly space velocity (GHSV) were varied. Table I includes the percent conversion to monoethylamine based on the ethanol charged, and the molar yield in percent of monoethylamine (MEA), diethylamine (DEA), triethylamine (TEA), acetonitrile (ACN), mono n-butylamine (MNBA), and the hydrocarbon content (HC).

TABLE I

| | | | Ethylamines From Ethanol Molar Yield | | | | | |
|---|---|---|---|---|---|---|---|---|
| N/R/H | GHSV | % Conv. | MEA | DEA | TEA | ACN | MNBA | HC |
| 2/1/1 | 1000 | 88.03 | 46.79 | 44.27 | 6.73 | 0.06 | 2.15 | 5.78 |
| 2/1/1 | 2000 | 82.01 | 50.73 | 39.10 | 10.01 | 0.16 | 0 | 1.64 |
| 2/1/1 | 3000 | 69.96 | 55.97 | 38.25 | 5.21 | 5.21 | 0.53 | — |
| 4/1/1 | 1000 | 95.98 | 52.43 | 40.47 | 6.86 | 0.03 | 0.21 | 2.67 |
| 4/1/1 | 2000 | 76.22 | 72.57 | 23.24 | 3.03 | 1.01 | 0.09 | 2.50 |
| 4/1/1 | 3000 | 72.47 | 68.64 | 27.17 | 2.01 | 0.22 | 0.43 | 3.01 |
| 8/1/1 | 1000 | 82.69 | 76.55 | 17.84 | 0 | 5.60 | 0 | — |
| 8/1/1 | 2000 | 72.87 | 72.97 | 10.68 | 2.76 | 13.32 | 0 | 2.72 |
| 8/1/1 | 3000 | 61.69 | 79.16 | 14.51 | 0 | 6.34 | 0 | 3.01 |
| 10/1/1 | 1000 | 77.48 | 58.95 | 36.74 | 5.21 | 0.41 | 0 | — |
| 10/1/1 | 2000 | 72.45 | 75.33 | 17.47 | 1.51 | 0.54 | 0 | — |
| 10/1/1 | 3000 | 66.19 | 67.29 | 17.48 | 7.32 | 7.55 | 0.36 | — |
| 16/1/1 | 1000 | 81.13 | 69.63 | 4.65 | 1.16 | 15.82 | 3.31 | — |
| 16/1/1 | 2000 | 73.97 | 57.22 | 8.43 | 17.17 | 12.56 | 4.61 | — |
| 16/1/1 | 3000 | 81.39 | 61.36 | 0.85 | 0 | 34.51 | 3.27 | — |
| 4/1/2 | 1000 | 87.90 | 28.05 | 59.46 | 11.55 | 0 | 0.94 | 7.10 |
| 4/1/0.5 | 1000 | 58.52 | 81.19 | 16.37 | 1.25 | 0 | 1.20 | — |
| 4/1/0.25 | 1000 | 54.72 | 71.93 | 21.29 | 2.55 | 1.15 | 3.10 | 1.55 |
| 2/1/1 | 1000 | 71.80 | 78.85 | 10.84 | 0 | 10.10 | 0.21 | — |
| 4/1/1 | 1000 | 83.54 | 50.85 | 41.79 | 7.36 | 0 | 0 | 3.29 |
| 8/1/1 | 1000 | 65.28 | 64.47 | 25.73 | 8.01 | 0 | 0.21 | 3.74 |

The results in Table 1 show that good conversion to amines was obtained with very little to practically no hydrocarbon being produced particularly where the molar ratio of ammonia to ethanol to hydrogen ranged from 10-16/1/1. On the other hand, the percent conversion increased slightly with increasing molar concentration of ammonia and the concentration of monoethylamine, on a molar basis, increased as compared to runs made at lower ammonia to ethanol to hydrogen ratios. It is important to note that as the molar concentration of ammonia to ethanol to hydrogen increased to about 16/1/1, the concentration of by-product acetonitrile increased substantially and, for these reasons, it would seem that the better results were obtained at a level of about 8-10/1/1.

Table 1 also shows as the hydrogen concentration increased above a 1:1 to that of ethanol, a higher concentration of hydrocarbon was produced. On the other hand, as the ratio of alkanol to hydrogen increased above about 1, e.g. 1/0.5 and 1/0.25, the hydrocarbon content was reduced. Although the data does not specifically show results, it is expected that if the ammonia to ethanol ratio ranged from about 4-10 to 1, and the ratio of hydrogen to ethanol was greater than 1, higher concentrations of monoethylamine would be produced.

EXAMPLE 2

The procedure of Example 1 was repeated with various nickel catalysts supported on silica and silica-alumina supports as taught in the prior art. The ratio of ammonia to ethanol to hydrogen was 4/1/1, and the reaction temperature was 420° F. Table 2 below represents the results for these particular catalyst materials.

TABLE 2

| Catalyst | % Molar Conv. | N/R/H | GHSV | T° F. | Yield Mole % | | | | | | | |
|---|---|---|---|---|---|---|---|---|---|---|---|---|
| | | | | | MEA | DEA | TEA | ACN | Et$_2$O | MNBA | CO$_2$ | HC |
| Ni-3210T | 64.9 | 4/1/1 | 1000 | 420 | 44.0 | 33.2 | 4.47 | 0.80 | ND | 0.20 | 0.22 | 17.13 |
| Ni-0148T | 41.2 | 4/1/1 | 1000 | 420 | 43.4 | 44.3 | 10.9 | 0.50 | ND | 0.12 | 0.05 | 0.78 |
| Ni-3266E | 84.5 | 4/1/1 | 1000 | 420 | 27.1 | 32.3 | 6.43 | ND | ND | ND | X's = | 33.6 |
| Ni-0104T | 87.8 | 4/1/1 | 1000 | 420 | 41.4 | 42.6 | 5.50 | 0.93 | ND | 2.18 | 0.90 | 6.52 |
| NiX649-93T | 85.7 | 4/1/1 | 1000 | 420 | 29.7 | 45.5 | 17.2 | 0.19 | ND | ND | 0.04 | 0.34 |

Ni-3210T catalyst is a nickel catalyst sold by the Harshaw Chemical Co.
Ni-0148T catalyst is a nickel catalyst sold by the Harshaw Chemical Co.
Ni-3266E catalyst is a nickel catalyst sold by the Harshaw Chemical Co.
Ni-0104T catalyst is a nickel catalyst sold by the Harshaw Chemical Co.
NiX649-93T catalyst is a nickel catalyst sold by the Harshaw Chemical Co.
ND = none detectable The results of Table 2 show that many nickel catalysts as utilized in the prior art for the production of ethylamine resulted in substantially lower quantities of monoethylamine as compared to the monoethylamine content prepared by the catalysts having a neutral alumina substrate as required by this invention. It should also be noted that the hydrocarbon content in the reaction mixture generally is substantially higher than that for the catalyst of Example 1.

What is claimed is:

1. A gas phase process for producing lower alkylamines by the ammonolysis of lower alkanols which comprises contacting a lower alkanol having 2 to 6 carbon atoms with 2 to 20 mols of ammonia per mol of alkanol in the presence of 0.25 to 4 mols of hydrogen per mol of alkanol and a Group 8 hydrogenation catalyst carried on a support at a temperature of from 350° to about 500° F., said hydrogenation catalyst being a finely divided hydrogenation catalyst comprising a Group 8 metal supported on a substantially neutral alumina support, said neutrality being incorporated into said support by the addition of an alkaline earth metal.

2. The process of claim 1 wherein said alkaline earth metal is selected from the group consisting of calcium, barium, or magnesium.

3. The process of claim 2 wherein said Group 8 metal is cobalt.

4. The process of claim 3 wherein said alkaline earth metal is added in the form of calcium or barium hydroxide or a salt thereof.

5. The process of claim 4 wherein the ratio of ammonia to alcohol is from about 8/1 to 10/1 on a molar basis.

6. The process of claim 4 wherein the alkanol is ethanol and the support has a pH of from 6.5–7.5.

* * * * *